ated Nov. 4, 2025

(12) United States Patent
Ahsan et al.

(10) Patent No.: US 12,464,172 B2
(45) Date of Patent: Nov. 4, 2025

(54) METHOD, APPARATUS AND COMPUTER PROGRAM PRODUCT PROVIDING FOR EXTENDED MARGINS AROUND A VIEWPORT FOR IMMERSIVE CONTENT

(71) Applicant: Nokia Technologies Oy, Espoo (FI)

(72) Inventors: Saba Ahsan, Espoo (FI); Igor Danilo Diego Curcio, Tampere (FI); Ari Hourunranta, Tampere (FI)

(73) Assignee: Nokia Technologies Oy, Espoo (FI)

( * ) Notice: Subject to any disclaimer, the term of this patent is extended or adjusted under 35 U.S.C. 154(b) by 388 days.

(21) Appl. No.: 17/768,598

(22) PCT Filed: Oct. 6, 2020

(86) PCT No.: PCT/EP2020/077940
§ 371 (c)(1),
(2) Date: Apr. 13, 2022

(87) PCT Pub. No.: WO2021/073940
PCT Pub. Date: Apr. 22, 2021

(65) Prior Publication Data
US 2024/0114176 A1 Apr. 4, 2024

Related U.S. Application Data

(60) Provisional application No. 62/915,309, filed on Oct. 15, 2019.

(51) Int. Cl.
*H04N 21/218* (2011.01)
*H04N 21/2343* (2011.01)
(Continued)

(52) U.S. Cl.
CPC ............ *H04N 21/21805* (2013.01); *H04N 21/234345* (2013.01); *H04N 21/41407* (2013.01); *H04N 21/6587* (2013.01); *H04N 21/816* (2013.01)

(58) Field of Classification Search
CPC ..... H04N 21/21805; H04N 21/234345; H04N 21/41407; H04N 21/6587; H04N 21/816;
(Continued)

(56) References Cited

U.S. PATENT DOCUMENTS 10,460,700 B1 * 10/2019 Mendhekar ............. H04L 65/80
2014/0270684 A1 * 9/2014 Jayaram ............... H04N 5/0733
386/224
(Continued)

OTHER PUBLICATIONS

Shi, Shu, et al., "Freedom: Fast Recovery Enhanced VR Delivery Over Mobile Networks", MobiSys'19, Jun. 17-21, 2019, pp. 130-141.
(Continued)

*Primary Examiner* — Alazar Tilahun
(74) *Attorney, Agent, or Firm* — McCarter & English, LLP

(57) ABSTRACT

A method, apparatus, and computer program product provide for extended margins around a viewport for immersive content. In the context of a method, the method receives panoramic video content and determines at least one motion signal. The method determines a viewport area, margin area, and background area for the panoramic video content based on the at least one motion signal and a quality level for each area. The method causes transmission of a request for updated panoramic video content in accordance with the determined quality levels. The method also receives updated panoramic video content in response to the request and causes rendering of the content for display.

20 Claims, 16 Drawing Sheets

(51) Int. Cl.
    *H04N 21/414*     (2011.01)
    *H04N 21/6587*    (2011.01)
    *H04N 21/81*      (2011.01)

(58) Field of Classification Search
    CPC .............. H04N 23/698; H04N 19/597; H04N 21/4728; H04N 19/167
    See application file for complete search history.

(56) References Cited

U.S. PATENT DOCUMENTS

| | | | |
|---|---|---|---|
| 2018/0077451 A1* | 3/2018 | Yip | H04N 13/194 |
| 2018/0174619 A1* | 6/2018 | Roy | H04N 21/47217 |
| 2018/0192001 A1* | 7/2018 | Boyce | H04N 19/597 |
| 2018/0309969 A1* | 10/2018 | Schluessler | H04N 5/911 |
| 2019/0089643 A1 | 3/2019 | Westphal et al. | |
| 2020/0162766 A1* | 5/2020 | Shi | H04N 21/4728 |
| 2021/0368190 A1* | 11/2021 | Sjöberg | H04N 21/6587 |
| 2022/0078396 A1* | 3/2022 | Gül et al. | H04N 21/4621 |

OTHER PUBLICATIONS

Fan, Ching-Ling et al., "Fixation Prediction for 360° Video Streaming in Head-Mounted Virtual Reality", In Proceeding of NOSSDAV'17, Taipei, Taiwan, Jun. 20-23, 2017, pp. 67-72.

* cited by examiner

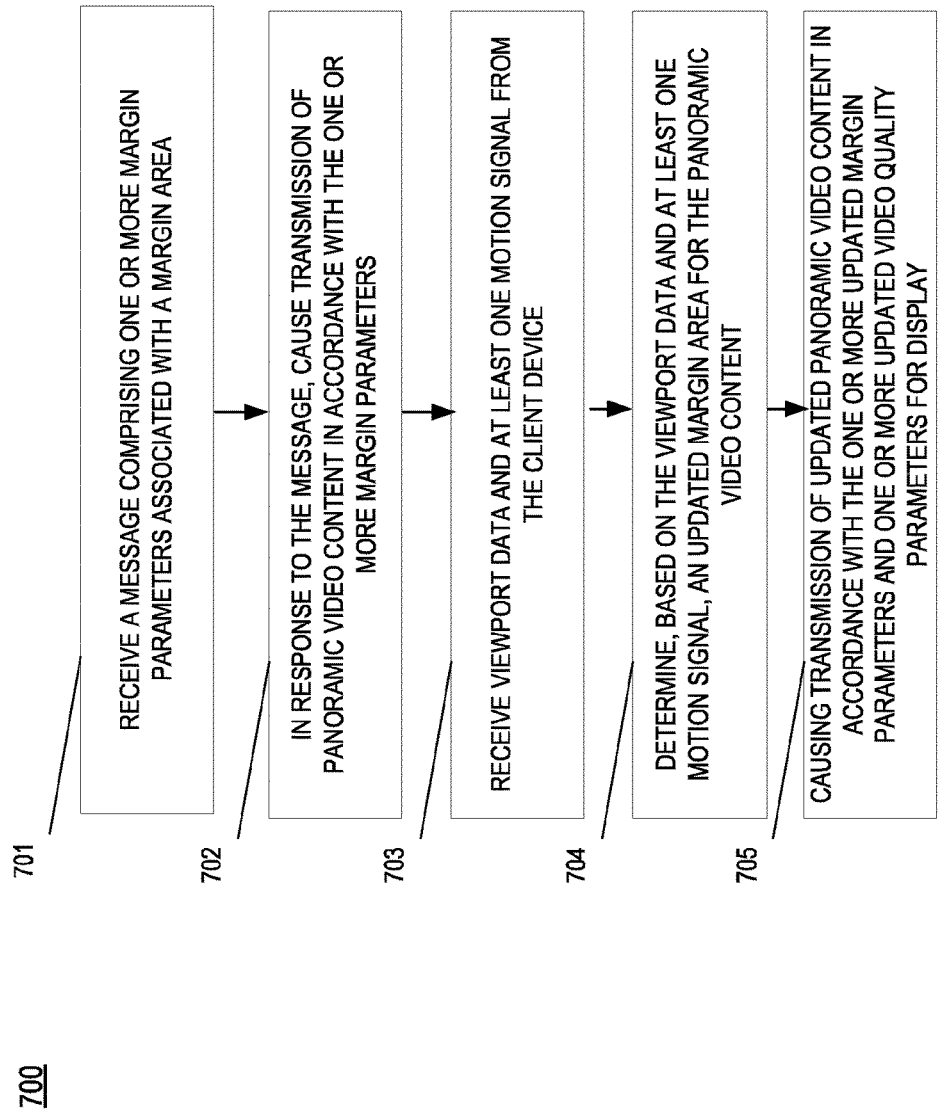

METHOD, APPARATUS AND COMPUTER PROGRAM PRODUCT PROVIDING FOR EXTENDED MARGINS AROUND A VIEWPORT FOR IMMERSIVE CONTENT

CROSS REFERENCE TO RELATED APPLICATION

This patent application is a U.S. National Stage application of International Patent Application Number PCT/EP2020/077940 filed Oct. 6, 2020, which is hereby incorporated by reference in its entirety, and claims priority to U.S. provisional application 62/915,309 filed Oct. 15, 2019, which is hereby incorporated by reference in its entirety.

TECHNOLOGICAL FIELD

An example embodiment relates generally to immersive content consumption, and, more particularly, to techniques for extending margins around a viewport during immersive content consumption.

BACKGROUND

An increasing amount of video content is captured and delivered for a variety of different applications. For example, video content may be delivered via streaming, such as for virtual reality applications or other types of applications. The video content that is captured and delivered may be expansive and may provide a panoramic view (e.g., a 360° panoramic, omnidirectional view). As such, a user who has only a limited field of view at any one instant may change their viewing direction, such as by rotating their head when the user is wearing a head-mounted display while continuing to view the video content. In conjunction with virtual reality content, the entire content of a panoramic video may be streamed to a player. The user of a virtual reality application generally has a limited field of view such that at any point in time the user views only a portion of the panoramic video content with the streaming of the remainder of the panoramic video content potentially creating inefficiencies with the consumption of bandwidth.

BRIEF SUMMARY

A method, apparatus, and computer program product are disclosed for providing for extended margins around a viewport for immersive content. In one embodiment, the method, apparatus and computer program product are configured to cause transmission of panoramic video content in accordance with one or more margin parameters. In this regard and based on at least one motion signal, the method, apparatus and computer program product are configured to determine an updated margin area for the panoramic viewport, and cause transmission of updated panoramic video content in accordance with the updated margin area for display. By providing for intelligent margin extension, user experience during immersive content consumption may be improved without any additional latency and in a manner that conserves bandwidth.

In an example embodiment, a method is provided comprising receiving, from the client device, a message comprising one or more margin parameters associated with a margin area and in response to the message, causing transmission of panoramic video content in accordance with the one or more margin parameters to the client device. The method further comprises receiving viewport data and at least one motion signal from the client device. The method further comprises determining, based on the viewport data and at least one motion signal, an updated margin area for the panoramic video content. The method further comprises causing transmission of updated panoramic video content in accordance with the updated margin area for display.

In some embodiments, the method further comprises causing transmission, to the client device, of an offer comprising one or more video quality parameters, wherein the message is received in response to the offer. In some embodiments, the offer comprises a session description protocol (SDP) offer. In some embodiments, the panoramic video content is transmitted in further accordance with the one or more video quality parameters. In some embodiments, the method further comprises determining, based at least on the updated margin area, one or more updated video quality parameters associated with the panoramic video content, wherein the updated panoramic video content is transmitted in further accordance with the one or more updated video quality parameters. In some embodiments, the at least one motion signal comprises an acceleration value and the viewport data comprises an orientation of the client device. In some embodiments, the one or more margin parameters of the acceptance message comprise one or more maximum values at which a respective margin of the panoramic video content is extendible. In some embodiments, the one or more margin parameters of the acceptance message comprise one or more minimum values at which a respective margin of the panoramic video content is extendible. In some embodiments, the one or more margin parameters of the acceptance message are associated with a fixed-size margin area, and the one or more updated margin parameters for the panoramic video content are determined in accordance with the fixed-size margin area. In some embodiments, the client device comprises a head-mounted display (HMD). In some embodiments, determining the updated margin area is further based on the panoramic video content.

In a further example embodiment, an apparatus is provided comprising at least one processor and at least one memory including computer program code, the at least one memory and the computer program code configured to, with the at least one processor, cause the apparatus at least to receive a message comprising one or more margin parameters associated with a margin area and in response to the message, cause transmission of panoramic video content in accordance with the one or more margin parameters. The apparatus is further configured to receive viewport data and at least one motion signal. The apparatus is further configured to determine, based on the viewport data and at least one motion signal, an updated margin area for the panoramic video content. The apparatus is further configured to cause transmission of updated panoramic video content in accordance with the updated margin area for display.

In some embodiments, the apparatus is further configured to cause transmission, to the client device, of an offer comprising one or more video quality parameters, wherein the message is received in response to the offer. In some embodiments, the offer comprises a session description protocol (SDP) offer. In some embodiments, the panoramic video content is transmitted in further accordance with the one or more video quality parameters. In some embodiments, the apparatus is further configured to determine, based at least on the updated margin area, one or more updated video quality parameters associated with the panoramic video content, wherein the updated panoramic video content is transmitted in further accordance with the one or more updated video quality parameters. In some embodiments, the at least one motion signal comprises an acceleration value and the viewport data comprises an orientation of the client device. In some embodiments, the one or more margin parameters of the acceptance message comprise one or more maximum values at which a respective margin of the panoramic video content is extendible. In some embodiments, the one or more margin parameters of the acceptance message comprise one or more minimum values at which a respective margin of the panoramic video content is extendible. In some embodiments, the one or more margin parameters of the acceptance message are associated with a fixed-size margin area, and the one or more updated margin parameters for the panoramic video content are determined in accordance with the fixed-size margin area. In some embodiments, determining the updated margin area is further based on the panoramic video content.

In a further example embodiment, an apparatus is provided comprising means for means for receiving a message comprising one or more margin parameters associated with a margin area. The apparatus further comprises means for causing, in response to the message, transmission of panoramic video content in accordance with the one or more margin parameters. The apparatus further comprises means for receiving viewport data and at least one motion signal. The apparatus further comprises means for determining, based on the viewport data and at least one motion signal, an updated margin area for the panoramic video content. The apparatus further comprises means for causing transmission of updated panoramic video content in accordance with the updated margin area for display.

In some embodiments, the apparatus further comprises means for causing transmission, to the client device, of an offer comprising one or more video quality parameters, wherein the message is received in response to the offer. In some embodiments, the offer comprises a session description protocol (SDP) offer. In some embodiments, the panoramic video content is transmitted in further accordance with the one or more video quality parameters. In some embodiments, the apparatus further comprises means for determining, based at least on the updated margin area, one or more updated video quality parameters associated with the panoramic video content, wherein the updated panoramic video content is transmitted in further accordance with the one or more updated video quality parameters. In some embodiments, the at least one motion signal comprises an acceleration value and the viewport data comprises an orientation of the client device. In some embodiments, the one or more margin parameters of the acceptance message comprise one or more maximum values at which a respective margin of the panoramic video content is extendible. In some embodiments, the one or more margin parameters of the acceptance message comprise one or more minimum values at which a respective margin of the panoramic video content is extendible. In some embodiments, the one or more margin parameters of the acceptance message are associated with a fixed-size margin area, and the one or more updated margin parameters for the panoramic video content are determined in accordance with the fixed-size margin area. In some embodiments, determining the updated margin area is further based on the panoramic video content.

In a further example embodiment, a computer program product is provided comprising a non-transitory computer readable storage medium having program code portions stored thereon with the program code portions being configured, upon execution, at least to receive a message comprising one or more margin parameters associated with a margin area and in response to the message, cause transmission of panoramic video content in accordance with the one or more margin parameters. The instructions are further configured to receive viewport data and at least one motion signal. The instructions are further configured to determine, based on the viewport data and at least one motion signal, an updated margin area for the panoramic video content. The instructions are further configured to cause transmission of updated panoramic video content in accordance with the updated margin area for display.

In some embodiments, the instructions are further configured to cause transmission, to the client device, of an offer comprising one or more video quality parameters, wherein the message is received in response to the offer. In some embodiments, the offer comprises a session description protocol (SDP) offer. In some embodiments, the panoramic video content is transmitted in further accordance with the one or more video quality parameters. In some embodiments, the instructions are further configured to determine, based at least on the updated margin area, one or more updated video quality parameters associated with the panoramic video content, wherein the updated panoramic video content is transmitted in further accordance with the one or more updated video quality parameters. In some embodiments, the at least one motion signal comprises an acceleration value and the viewport data comprises an orientation of the client device. In some embodiments, the one or more margin parameters of the acceptance message comprise one or more maximum values at which a respective margin of the panoramic video content is extendible. In some embodiments, the one or more margin parameters of the acceptance message comprise one or more minimum values at which a respective margin of the panoramic video content is extendible. In some embodiments, the one or more margin parameters of the acceptance message are associated with a fixed-size margin area, and the one or more updated margin parameters for the panoramic video content are determined in accordance with the fixed-size margin area. In some embodiments, determining the updated margin area is further based on the panoramic video content.

In a further example embodiment, a method is provided comprising receiving, at a client device, panoramic video content from a source device. The method further comprises determining, at the client device, at least one motion signal. The method further comprises determining, based on the at least one motion signal, a viewport area, margin area, and background area for the panoramic video content, wherein a width of the margin area is increased based at least on a direction of the at least one motion signal the method further comprises determining a respective quality level for the viewport area, the margin area, and the background area. The method further comprises causing transmission of a request for updated panoramic video content to the source device, wherein the updated panoramic video content is based on the viewport area, margin area, and background area and in accordance with the respective quality level for the viewport area, the margin area, and the background area. The method further comprises receiving in response to the request, the updated panoramic video content from the source device. The method further comprises causing rendering of the updated panoramic video content for display.

In some embodiments, the at least one motion signal comprises data associated with a direction and an acceleration value and the width of the margin area is increased based at least on the direction and the acceleration value of the at least one motion signal. In some embodiments, the panoramic video content is tile-based, and the viewport area, the margin area, and the background area each comprise a subset of tiles of a plurality of tiles associated with the panoramic video content. In some embodiments, the client device comprises a head-mounted display (HMD).

In a further example embodiment, an apparatus is provided comprising at least one processor and at least one memory including computer program code, the at least one memory and the computer program code configured to, with the at least one processor, cause the apparatus at least to receive, at a client device, panoramic video content from a source device. The apparatus is further configured to determine, at the client device, at least one motion signal. The apparatus is further configured to determine, based on the at least one motion signal, a viewport area, margin area, and background area for the panoramic video content, wherein a width of the margin area is increased based at least on a direction of the at least one motion signal the method further comprises determining a respective quality level for the viewport area, the margin area, and the background area. The apparatus is further configured to cause transmission of a request for updated panoramic video content to the source device, wherein the updated panoramic video content is based on the viewport area, margin area, and background area and in accordance with the respective quality level for the viewport area, the margin area, and the background area. The apparatus is further configured to receive, in response to the request, the updated panoramic video content from the source device. The apparatus is further configured to cause rendering of the updated panoramic video content for display. In some embodiments, the at least one motion signal comprises data associated with a direction and an acceleration value and the width of the margin area is increased based at least on the direction and the acceleration value of the at least one motion signal. In some embodiments, the panoramic video content is tile-based, and the viewport area, the margin area, and the background area each comprise a subset of tiles of a plurality of tiles associated with the panoramic video content.

In a further example embodiment, an apparatus is provided comprising means for receiving panoramic video content from a source device. The apparatus further comprises means for determining at least one motion signal. The apparatus further comprises means for determining, based on the at least one motion signal, a viewport area, margin area, and background area for the panoramic video content, wherein a width of the margin area is increased based at least on a direction of the at least one motion signal the method further comprises determining a respective quality level for the viewport area, the margin area, and the background area. The apparatus further comprises means for causing transmission of a request for updated panoramic video content, wherein the updated panoramic video content is based on the viewport area, margin area, and background area and in accordance with the respective quality level for the viewport area, the margin area, and the background area. The apparatus further comprises means for receiving in response to the request, the updated panoramic video content. The apparatus further comprises means for causing rendering of the updated panoramic video content for display. In some embodiments, the at least one motion signal comprises data associated with a direction and an acceleration value and the width of the margin area is increased based at least on the direction and the acceleration value of the at least one motion signal. In some embodiments, the panoramic video content is tile-based, and the viewport area, the margin area, and the background area each comprise a subset of tiles of a plurality of tiles associated with the panoramic video content.

In a further example embodiment, a computer program product is provided comprising a non-transitory computer readable storage medium having program code portions stored thereon with the program code portions being configured, upon execution, at least to receive, at a client device, panoramic video content from a source device. The instructions are further configured to determine, at the client device, at least one motion signal. The instructions are further configured to determine, based on the at least one motion signal, a viewport area, margin area, and background area for the panoramic video content, wherein a width of the margin area is increased based at least on a direction of the at least one motion signal the method further comprises determining a respective quality level for the viewport area, the margin area, and the background area. The instructions are further configured to cause transmission of a request for updated panoramic video content to the source device, wherein the updated panoramic video content is based on the viewport area, margin area, and background area and in accordance with the respective quality level for the viewport area, the margin area, and the background area. The instructions are further configured to receive, in response to the request, the updated panoramic video content from the source device. The instructions are further configured to cause rendering of the updated panoramic video content for display. In some embodiments, the at least one motion signal comprises data associated with a direction and an acceleration value and the width of the margin area is increased based at least on the direction and the acceleration value of the at least one motion signal. In some embodiments, the panoramic video content is tile-based, and the viewport area, the margin area, and the background area each comprise a subset of tiles of a plurality of tiles associated with the panoramic video content.

BRIEF DESCRIPTION OF THE DRAWINGS

Figure 1:
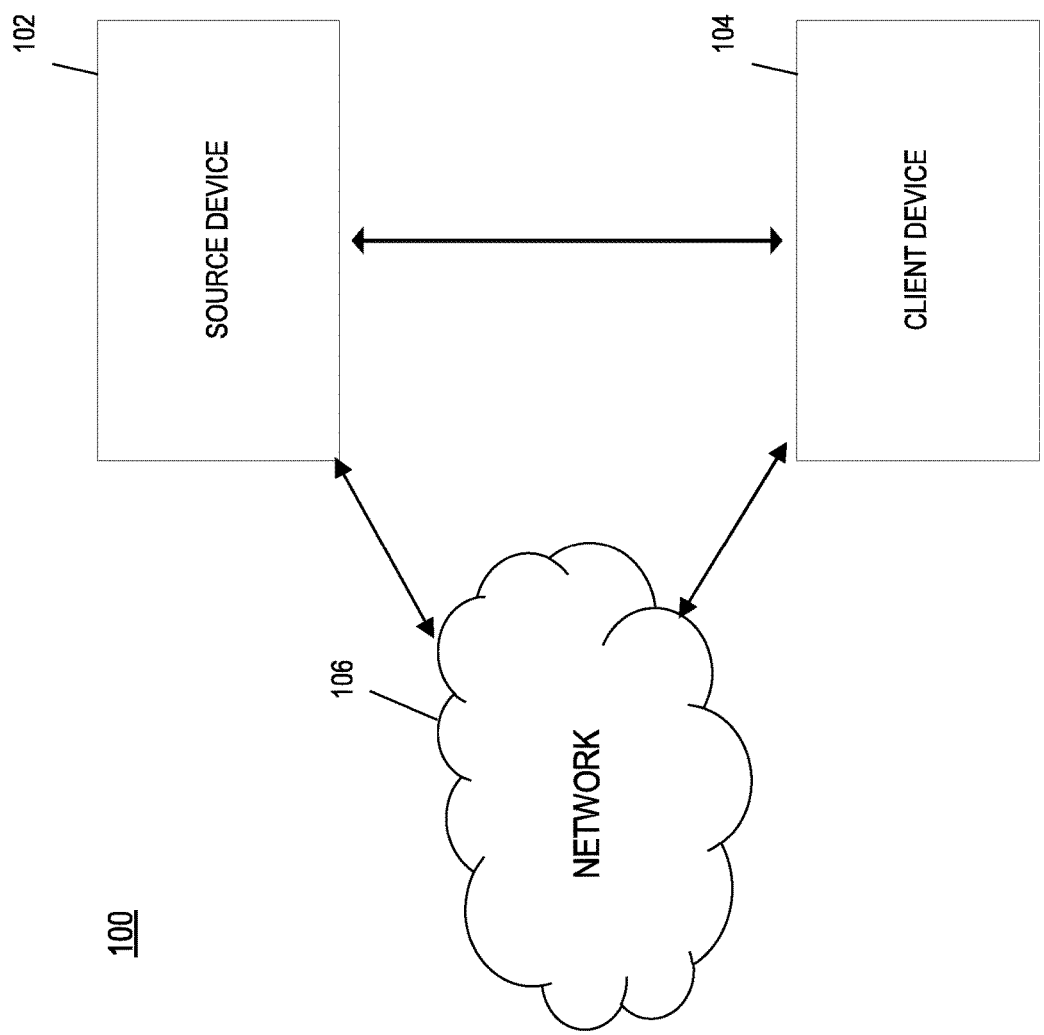
Figure 2:
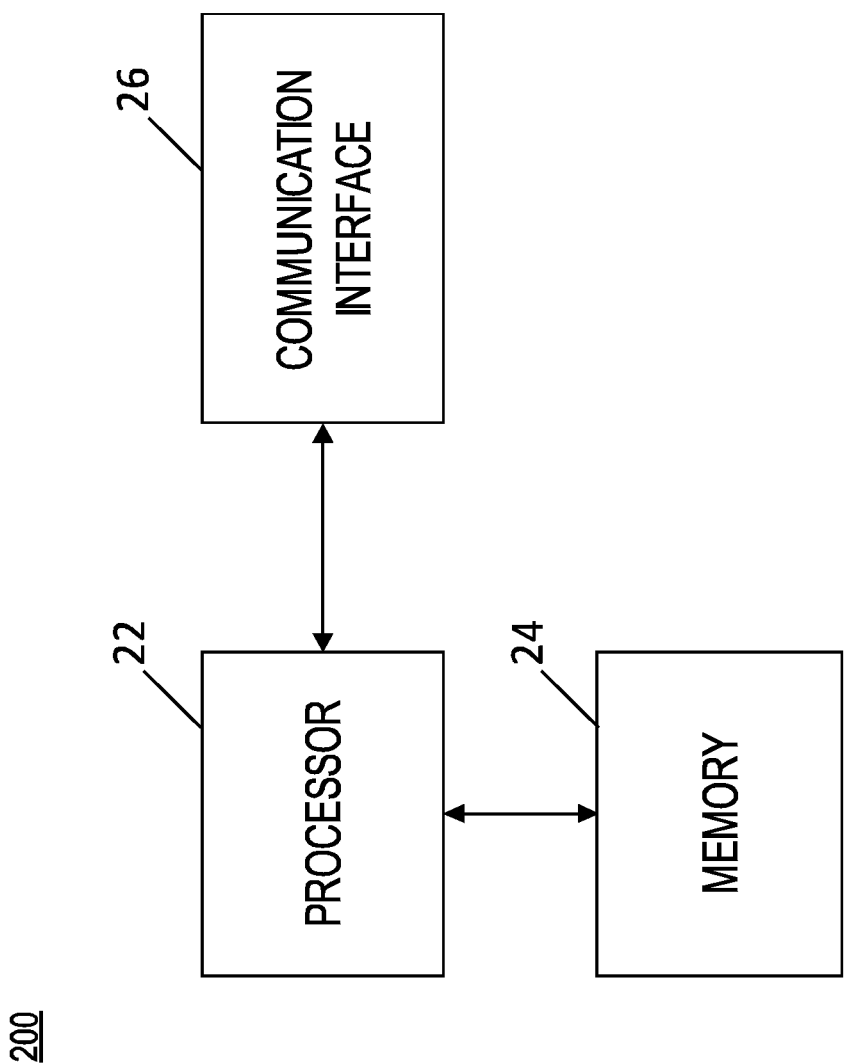
Figure 3A:
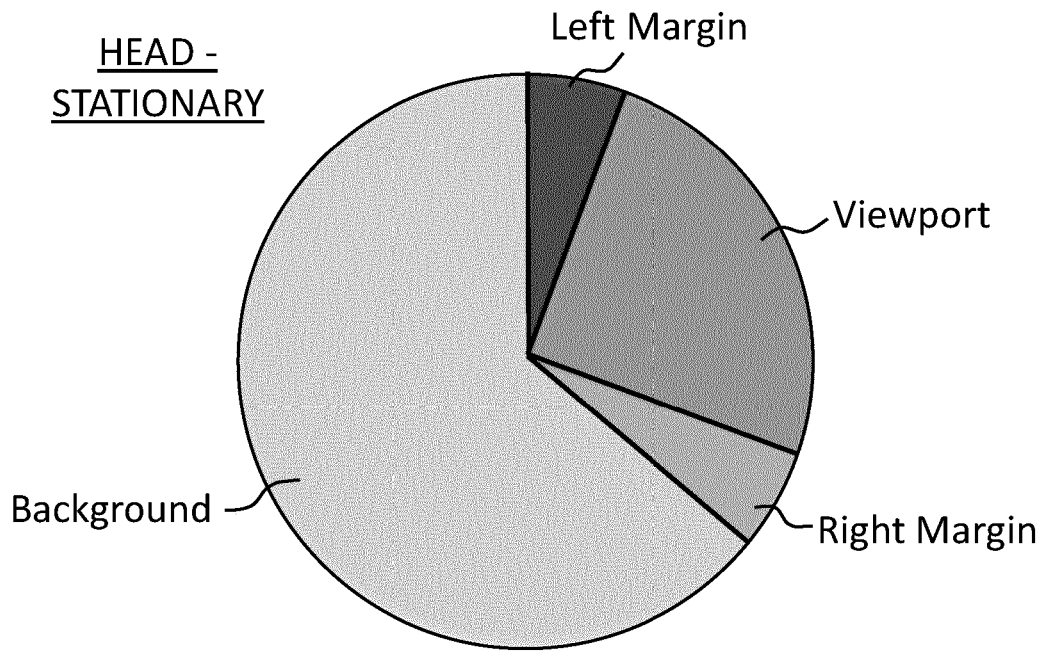
Figure 3B:
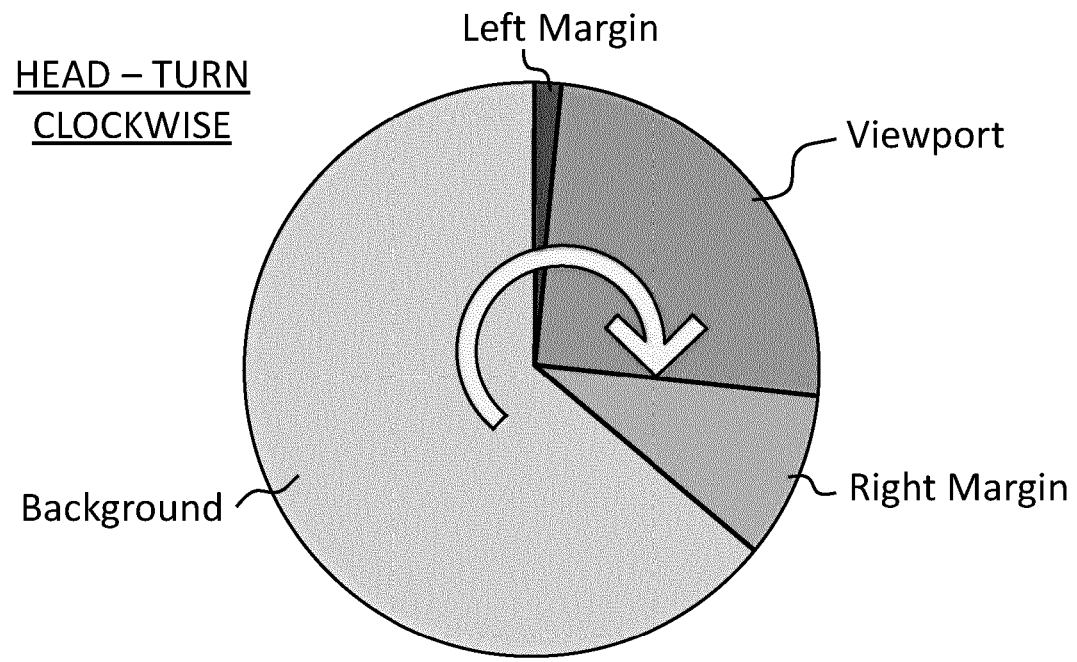
Figure 3C:
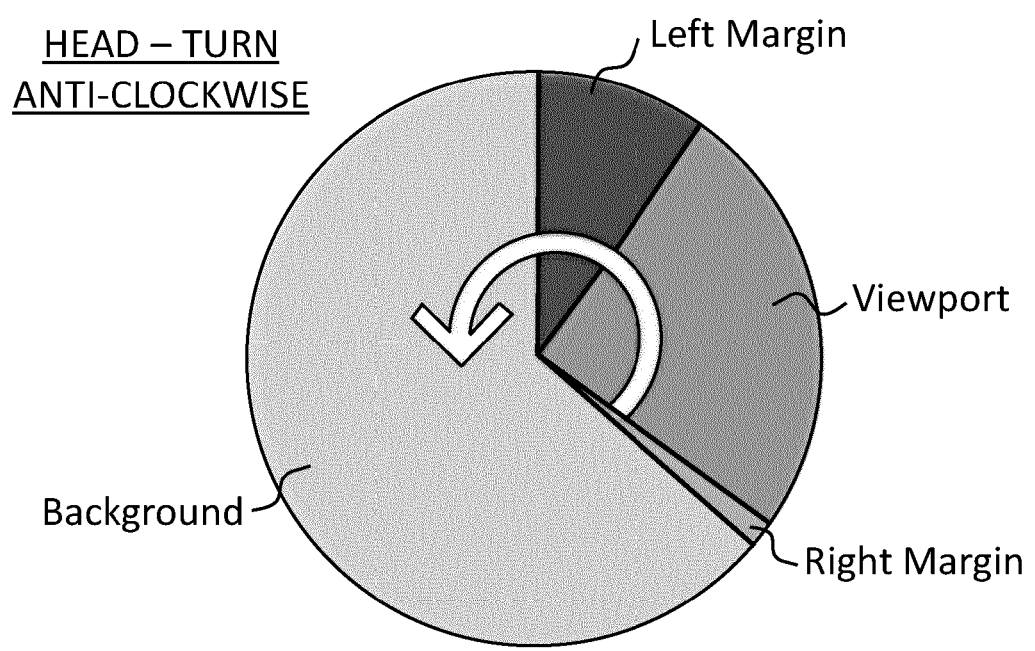
Figure 4A:
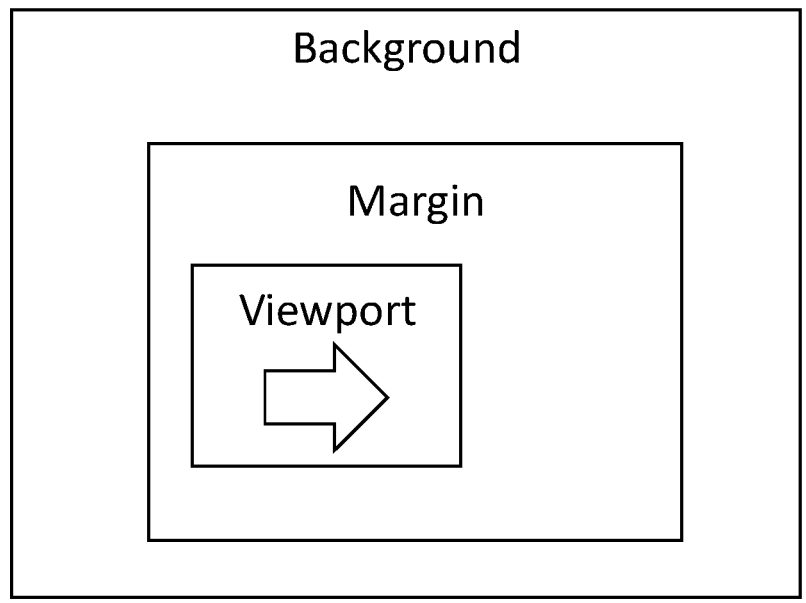
Figure 4B:
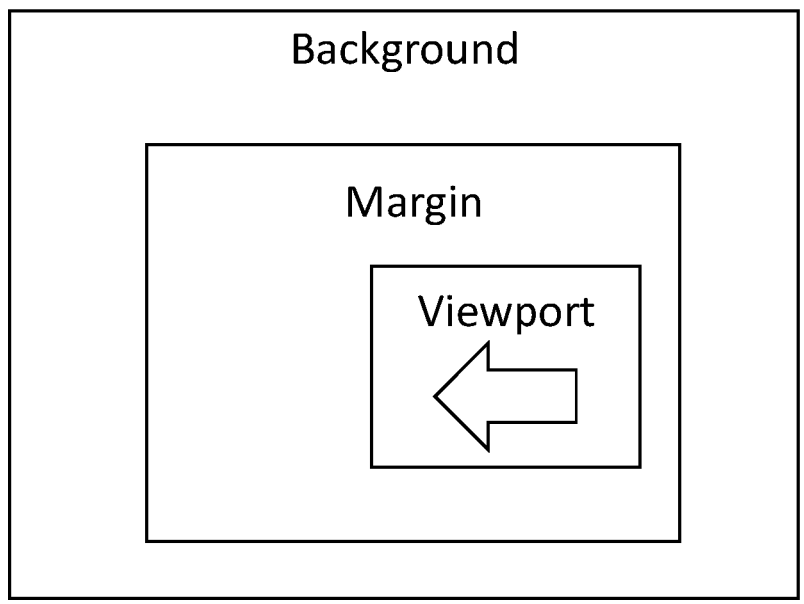
Figure 4C:
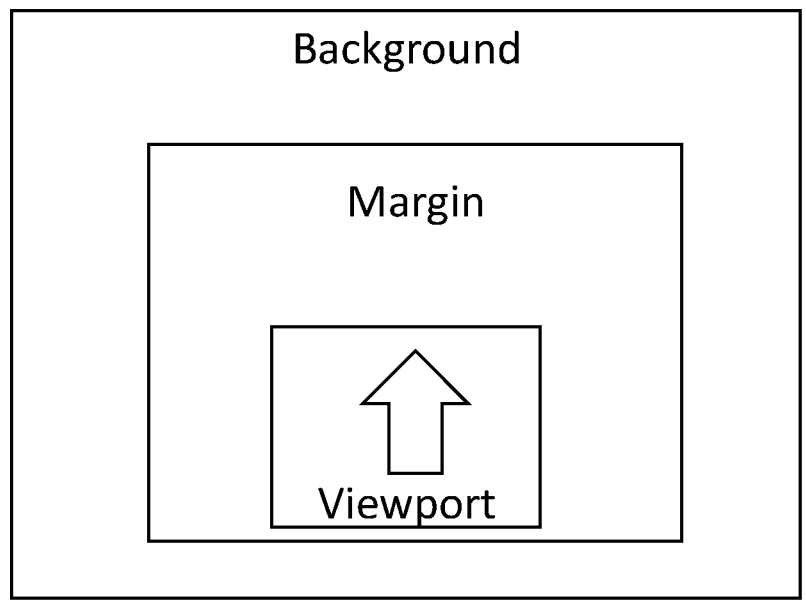
Figure 4D:
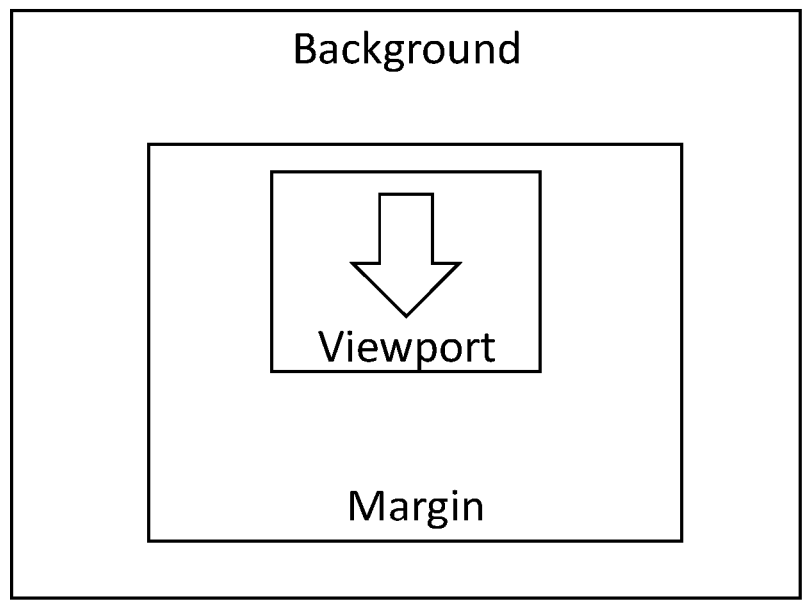
Figure 6A:
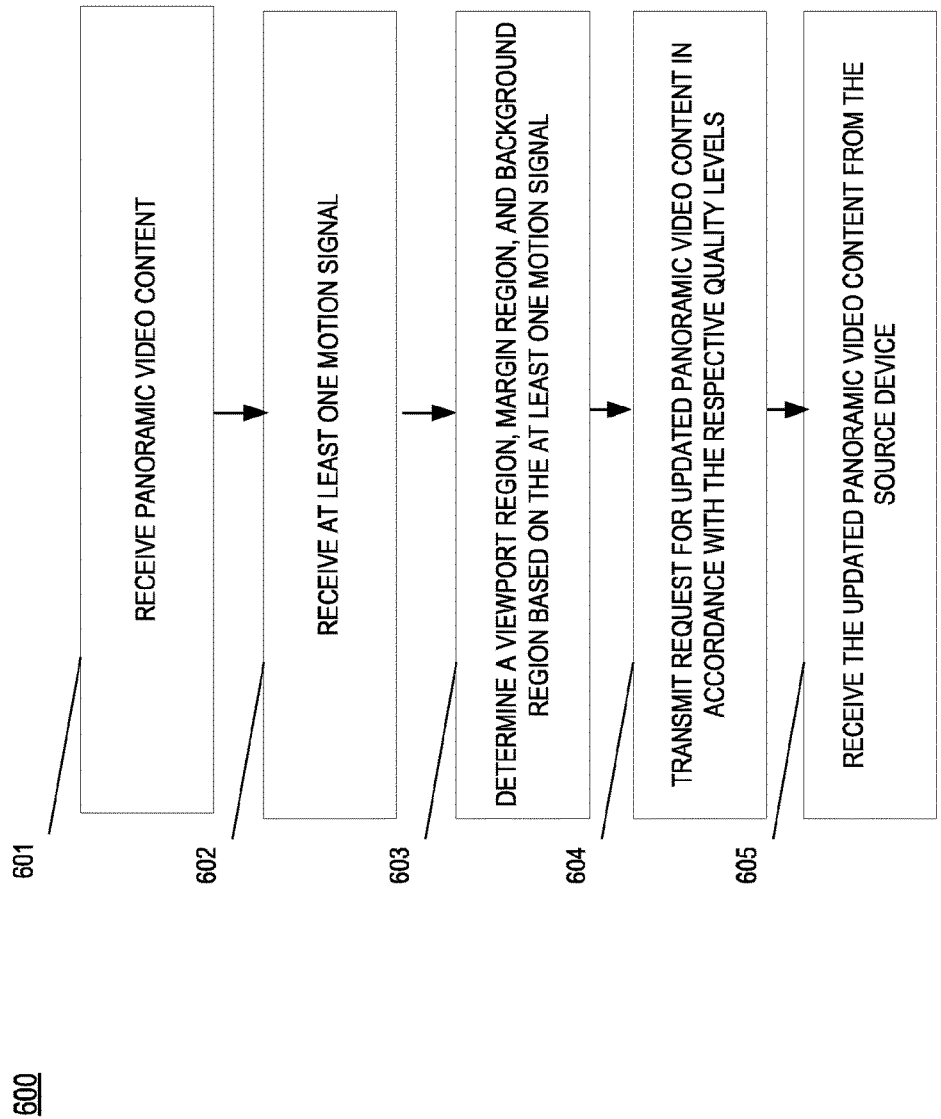
Figure 6B:
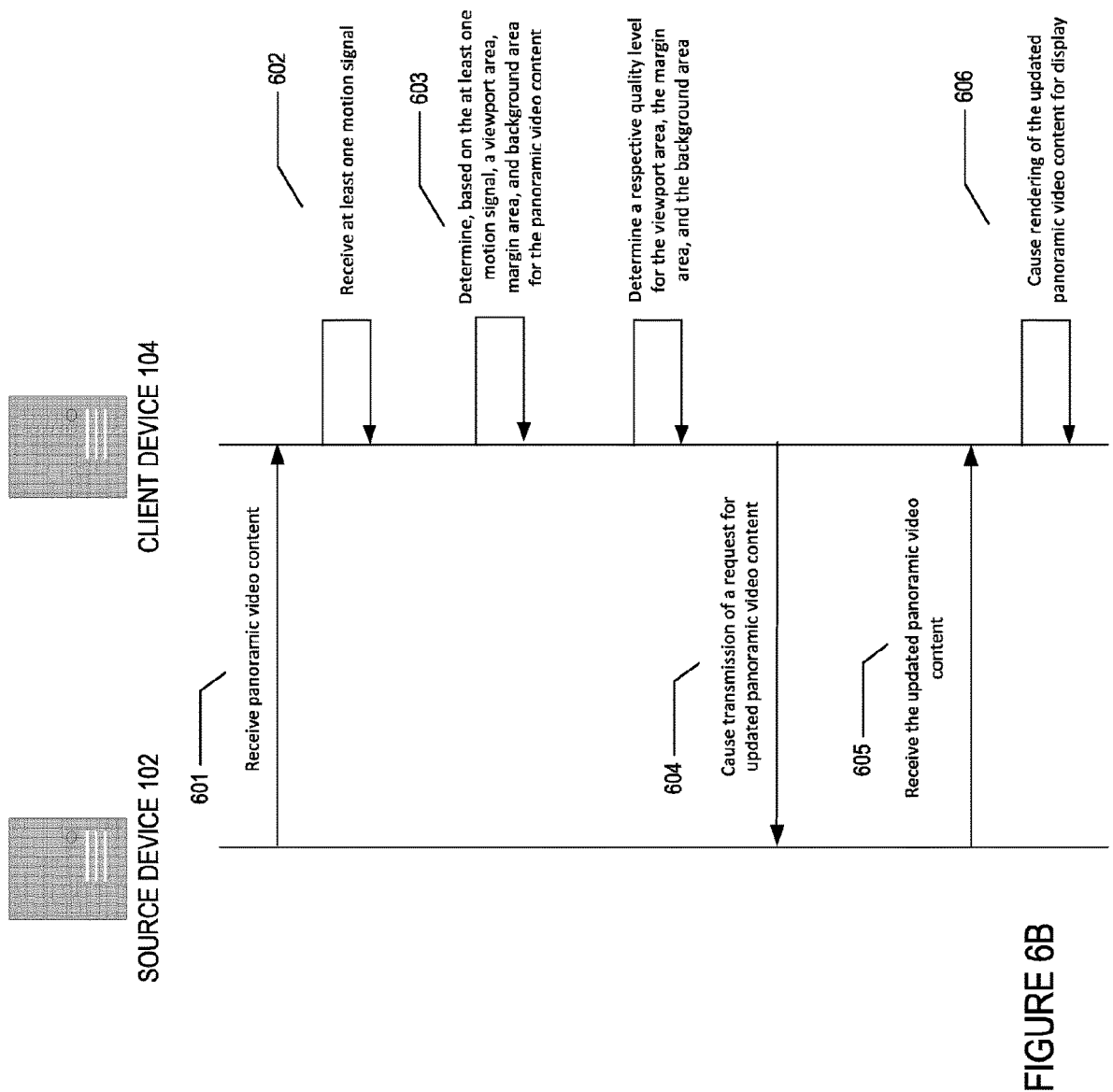
Figure 7B:
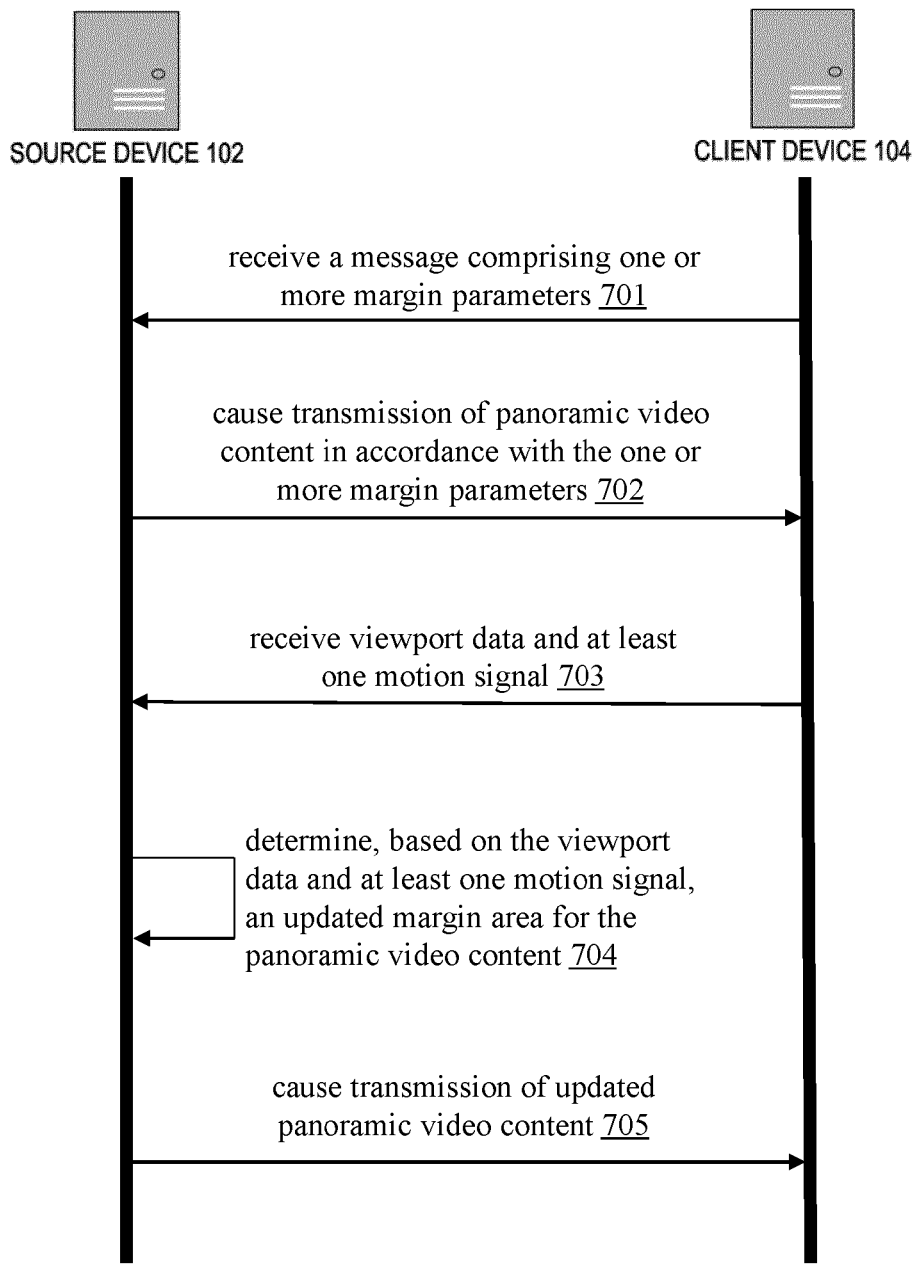

Having thus described certain example embodiments of the present disclosure in general terms, reference will hereinafter be made to the accompanying drawings, which are not necessarily drawn to scale, and wherein:

FIG. 1 is a block diagram of a system including a source device and a client device configured to communicate via a network in accordance with an example embodiment;

FIG. 2 is a block diagram of an apparatus that may be specifically configured in accordance with an example embodiment of the present disclosure;

FIG. 3A-C illustrate views of areas of a 360-degree video in accordance with some example embodiments;

FIG. 4A-D illustrate views of areas of a 360-degree video in accordance with some example embodiments;

FIG. 5A-D illustrate views of areas of a 360-degree video in accordance with some example embodiments;

FIG. 6A is a flow chart illustrating the operations performed, such as by the apparatus of FIG. 2 in accordance with an example embodiment;

FIG. 6B is a signal diagram of an example data flow in accordance with an example embodiment;

FIG. 7A is a flow chart illustrating the operations performed, such as by the apparatus of FIG. 2, in accordance with an example embodiment; and FIG. 7B is a signal diagram of an example data flow in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Referring now to FIG. 1, a block diagram of a system 100 is illustrated for providing for intelligently extended margins around a viewport for immersive content, according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing and receiving non-viewport content as compressed still images, numerous other configurations may also be employed.

The system 100 may include one or more first devices, e.g., client devices 104 (examples of which include but are not limited to a head-mounted display, camera, omnidirectional video device, virtual reality system, augmented reality system, video playback device and/or the like), and/or one or more second devices, e.g., source devices 102 (also known as a server, remote computing device, remote server, and/or the like). Although the disclosure describes an example embodiment comprising a client-server architecture, the disclosure is not limited to a client-server architecture, but is also applicable to other architectures, such as peer-to-peer, broadcast/multicast, distributed, multi-party, point-to-point or point-to-multipoint, etc. In this regard, the first device can encompass other types of computing and/or communication devices other than a client device 104 and the second device can encompass other types of computing and/or communication devices other than a source device 102. For example, in a point-to-point architecture, the first device and the second device may be of the same type of device, such as mobile phones or tablets with 360-degree content display capabilities in a stand-alone mode or tethered with another virtual reality or augmented reality display device.

The system 100 may further comprise a network 106. The network 106 may comprise one or more wireline networks, one or more wireless networks, or some combination thereof. The network 106 may, for example, comprise a serving network (e.g., a serving cellular network) for one or more source devices 102. The network 106 may comprise, in certain embodiments, one or more source devices 102 and/or one or more client devices 104. According to an example embodiment, the network 106 may comprise the Internet. In various embodiments, the network 106 may comprise a wired access link connecting one or more source devices 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) long term evolution (LTE) (also referred to as LTE-A) standards, current and future implementations of International Telecommunications Union (ITU) International Mobile Telecommunications Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more source devices 102 may be configured to connect directly with one or more client devices 104 via, for example, an air interface without routing communications via one or more elements of the network 106. Additionally, or alternatively, one or more of the source devices 102 may be configured to communicate with one or more of the client devices 104 over the network 106. In this regard, the client devices 104 may comprise one or more nodes of the network 106.

According to various embodiments, the system 100 may be configured according to an architecture for providing for panoramic video streaming. For example, the system 100 may be configured to provide for immersive video streaming and techniques to support a wide variety of applications including virtual reality and augmented reality applications.

One example of an apparatus 200 that may be configured to function as the source device 102 and/or client device 104 is depicted in FIG. 2. As shown in FIG. 2, the apparatus 200 includes, is associated with or is in communication with processing circuitry 22, a memory 24 and a communication interface 26. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally, or alternatively, the memory device could be configured to store instructions for execution by the processing circuitry.

The apparatus 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

It is to be understood that signaling between the source device 102 and the client device 104 may be carried out over any protocol at any layer of the International Organization for Standardization (ISO) Open Systems Interconnection (OSI) protocol stack (e.g., Session Description Protocol (SDP), Session Initiation Protocol (SIP), Real Time Streaming Protocol (RTSP), Real-Time Transport Protocol (RTP), Real-Time Transport Control Protocol (RTCP), Moving Pictures Experts Group Dynamic Adaptive Streaming over Hypertext Transfer Protocol (HTTP) (MPEG DASH) and the like). It is to be understood that reference to 'downloading' and 'streaming' data herein, while perhaps implemented through different transport protocol mechanisms, relate to similar functional concepts in this context.

As a user streams and consumes panoramic content (referenced hereinafter as 360-degree content by way of example but not of limitation) on a client device 104 (e.g., a virtual reality device such as a head-mounted display), content within a viewport area is visible to the user. In other words, content that the user is viewing at any given time is viewport area content. For content delivered over a network 106, the entirety of the 360-degree content may be downloaded, with viewport content being downloaded at a higher quality than content not currently being viewed by the user (e.g., a background area). For example, background area content may be downloaded in a lower quality than the viewport content to preserve bandwidth.

In addition to a viewport area and background area, a margin area (sometimes referred to as guard band(s)) may be extended around the viewport area. The margin area of an example embodiment may comprise a left margin area, right margin area, top margin area, and bottom margin area. In some embodiments, the margin area may be downloaded with an intermediate quality between the viewport area quality (higher quality) and the background area quality (lower quality). Margin areas may be useful during rendering. In this regard, a margin area may be extended, fully or partially, around a viewport area to compensate for any deviation of the actual viewport at the time of viewing from the predicted viewport at the time of rendering (e.g., using time warping). Margins have typically been symmetrical on opposite sides of the viewport, regardless of the state of head motion (e.g., a user turning their head while wearing a head-mounted display).

The method, apparatus and computer program product of the present disclosure intelligently extend a margin area during and, in some embodiments, in response to user head motion. In this regard, the margin area may be extended, or broadened, in the direction of the head motion (e.g., left, right, up, down, diagonal), that is, on the side toward which the head is turning. For example, a head turning from the left to the right may cause the margin area on the right side of the viewport to be extended. The margin extension may be controlled, such as in terms of the amount of the extension beyond a baseline width, by a motion parameter, such as the velocity or acceleration, of the head turn, extending farther when the head is moving faster in comparison to a smaller extension for a slower head movement. Once the head is again at a stationary position, the margin area may return to being equal (e.g., symmetrical at the baseline width) on opposite sides of the viewport. Alternatively, this uneven extension of margins on either side of the viewport area may be based on the content being viewed, with a wider margin area extended in the direction that a user is more likely to turn at that point in time based on the content (e.g., audio, video, and/or the like). For example, the upcoming video may include activity that exits the current position of the viewport to the right and/or the upcoming audio may include sounds to the right of the current position of the viewport. In this example embodiment, a user may be determined likely to turn their head to the right, thereby leading to an increase in the margin to the right of the viewport. Additionally, or alternatively, an increase in margin in any given direction may also be performed proactively using a look-ahead mechanism as allowed by the transmitted media content. For example, during transmission of pre-stored media, a source device may perform look-ahead functionalities within the audio stream to determine one or more directional audio cues that may lead to a user head movement and, in response, increase the margin area proactively. Similar functionality may be applies in a case in which watching patterns of a user are known in advance based on historical viewing statistics and/or the like.

As latency is added in order to render, download, or otherwise process the margin area, the total margin area may be limited in order to correspondingly avoid unnecessary latency. For example, the total margin extension may be limited to the margin extension provided at a threshold velocity or acceleration value, beyond which the benefits of a further margin extension upon the user experience are not perceptible. In other words, beyond a certain speed of head motion, it is not any more useful to extend the margin area, due to the speed being high enough that the focus in vision cannot be maintained by a human. In this regard, intelligently distributing margins about a viewport rather than keeping the margins equal on opposite sides of the viewport provides for an improved user experience while limiting any latency that is added.

FIGS. 3A-C illustrate top views of areas of a 360-degree video in accordance with some example embodiments. In this regard, a 360-degree video is being streamed and/or viewed by a user at a client device (e.g., a user wearing a head-mounted display (HMD)). A background area (content outside of the viewport not presently being viewed) along with a margin area (e.g., left and right margin areas) and a viewport area (content presently being viewed) are shown. FIG. 3A represents a state in which a user's head is at a stationary position while wearing the HMD client device. While in a stationary position, the left margin area and right margin area may be equal in size. For example, the total range of the margin area, represented as Өm, is limited by the sum of the left margin area, Өlm, and the right margin area, Өrm, and always equal to the defined limit (i.e., Өlm+Өrm=Өm).

FIG. 3B represents a state in which the user's head is turning clockwise. As illustrated in this example embodiment, Өm remains the same, but the right margin area may comprise a greater percentage of θm. Further, as illustrated in FIG. 3C, in a state in which the user's head is turning counter-clockwise and in which Өm remains the same, the left margin may be extended farther, or in other words, the left margin area may comprise a greater percentage of Өm.

In some embodiments, values for Өlm and Өrm may be selected based on angular acceleration of a head-turn. In other words, when the head is turning clockwise, Өrm is directly proportional to the angular acceleration of the head turn, and when the head is turning counter-clockwise, Өlm is directly proportional to the angular acceleration of the head turn. In an embodiment in which Өm remains the same, when the head is turning clockwise, Өlm is inversely proportional to the angular acceleration of the head turn, and when the head is turning counter-clockwise, Өrm is inversely proportional to the angular acceleration of the head turn. In an embodiment, the client device 104 (e.g, HMD) may be equipped with one or more gyroscopes, accelerometers, magnetometers, and/or the like to determine and/or provide the values needed for such estimates to the processing circuitry 22.

In some embodiments, based on a relatively large acceleration and velocity of a clockwise head movement, Өrm may become equal to Өm, and Өlm may become equal to zero. Likewise, based on a relatively large acceleration and velocity of a counter-clockwise head movement, Өlm may become equal to Өm, and Өrm may become equal to zero. In certain embodiments, the velocity or acceleration value may be high enough such that Өlm or Өrm becomes greater than Өm, up to a threshold.

Figure 5A:
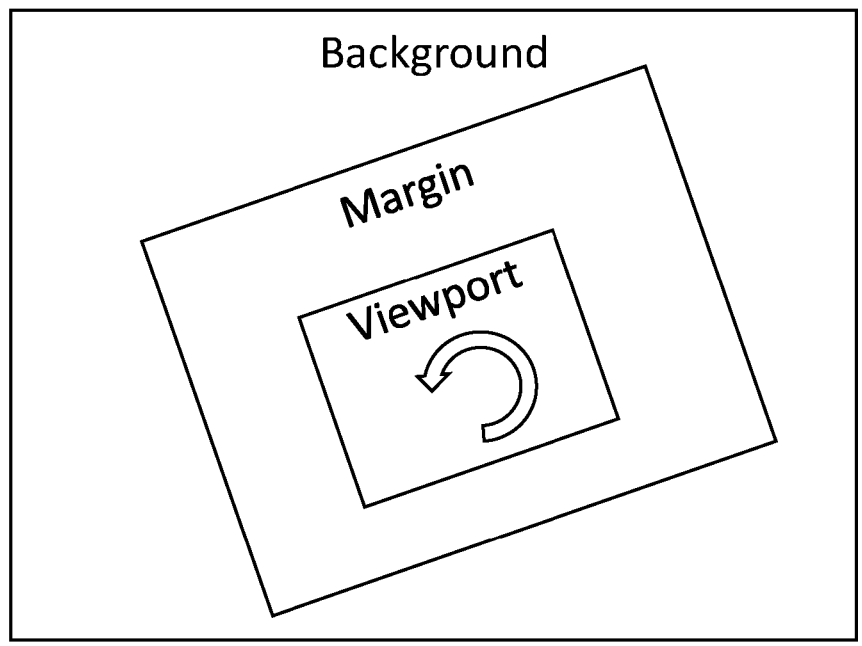
Figure 5B:
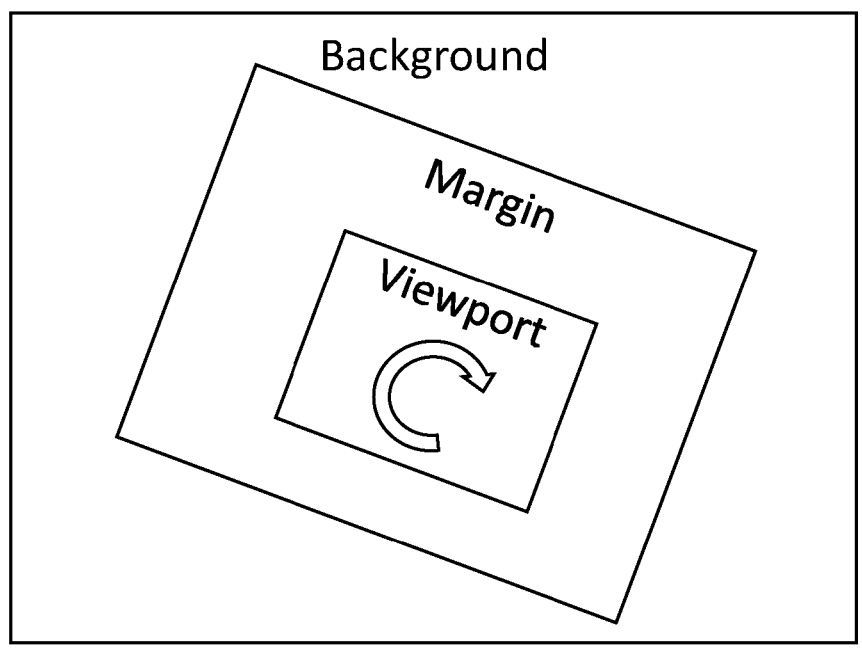

The foregoing examples discuss head movement toward the right and left of a viewport. However, the method, apparatus and computer program product of other example embodiments may provide for an extension of the margin in response to head movement in other directions, such as toward the top or bottom of the viewport, including more complex directions, such as toward the upper right or lower left of the viewport. FIGS. 4A-D illustrate an alternative visual representation of the extension of margin areas. FIGS. 4A-D illustrate an example extension of margin area when the head is turning any one or more of left, right, upwards, and downwards. In some embodiments, a head movement may comprise a rolling or diagonal motion. In this regard, FIGS. 5A-D illustrate an example extension of margin area. FIG. 5A depicts an embodiment in which the head is rolling to the left, and FIG. 5B depicts an embodiment in which the head is rolling to the right. In these instances, the margin area is extended equally in all directions (e.g., top, bottom, left, and right), however, uneven extensions may be made even during a rolling motion such as the ones illustrated in FIGS. 5A-B.

Figure 5C:
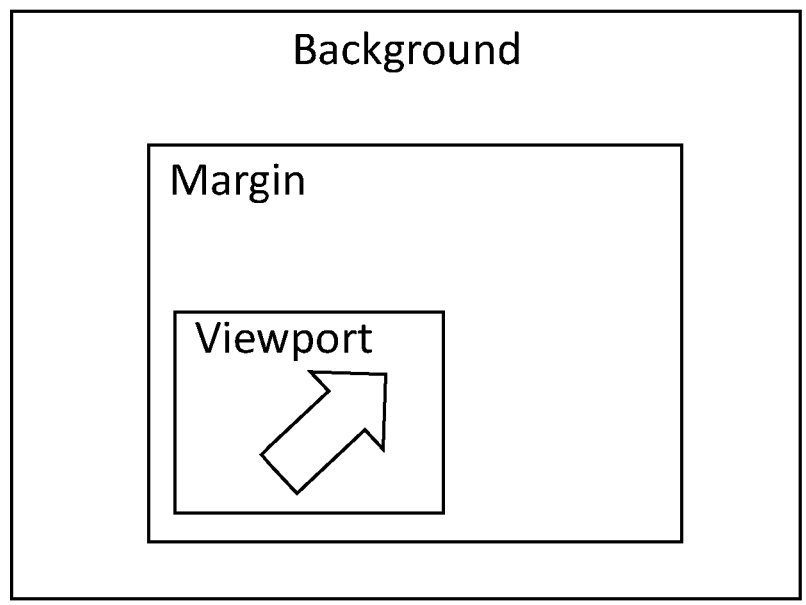
Figure 5D:
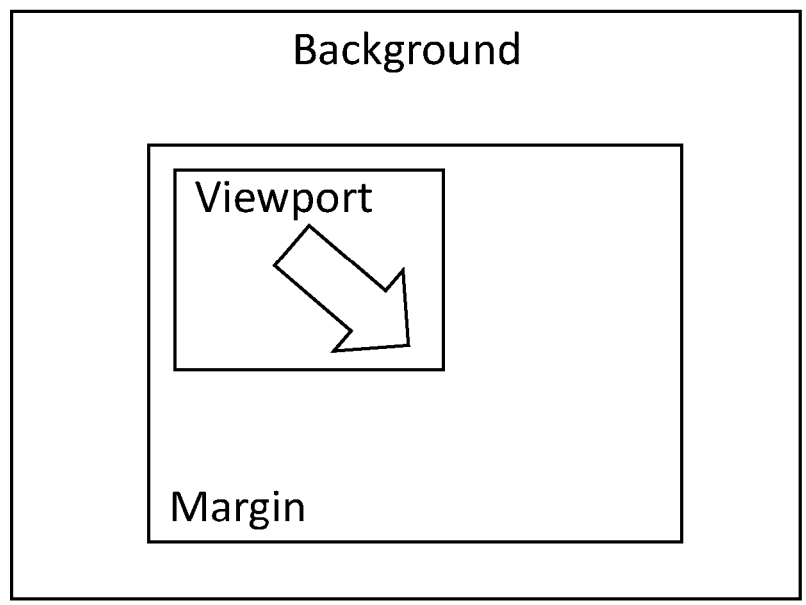

FIGS. 5C-D depict two example diagonal head movements, with FIG. 5C illustrating an upward-right movement and FIG. 5D illustrating a downward right movement. In these examples, the top and the bottom margin areas are extended during diagonal motion toward the upper-right in FIG. 5C and toward the lower right in FIG. 5D.

Alternatively, the uneven extension of margin areas on any side may be based on the content being streamed and/or viewed (e.g., 360-degree video content being viewed by a user via a HMD), with a wider margin area in the direction that the user is more likely to turn at a given point in time based on the audio, video, and/or other context associated with the streamed content, such as described above. In some embodiments, margin areas may be used on all sides (right, left, top, bottom, diagonal) and the relation of the width of the margin area to angular motion is applicable to all directions (right, left, up, down, diagonal). In some embodiments, the asymmetry in the width of the margin areas may be based on a parameter other than angular motion, such as, for example, the direction of sound or motion within the streamed content, changes in the content's recommended viewport for a next frame, and/or the like. Additionally, or alternatively, the margin areas may be used during downloading content at different quality levels for purposes of bandwidth preservation, and/or during rendering to compensate for any deviation of the actual viewport from one that was predicted at the time of rendering.

In embodiments in which margin areas are downloaded for panoramic content, signaling may be used between a source device 102 and a client device 104. FIGS. 6A and 7A depict operations for two example embodiments. In both cases, tile-based viewport dependent 360-degree content is fetched from a source device 102 by a client device 104 over the network 106. The fetched content is played at the source device using a VR display (e.g., HMD).

FIG. 6A illustrates a method 600 that may be performed by the client device 104. In this regard, the client device 104 includes means, such as the processing circuitry 22, communication interface 26, or the like, for receiving panoramic video content at operation 601. In certain embodiments, the client device 104 may receive the panoramic video stream from the source device 102 and/or via the network 106. For example, a user may stream panoramic (e.g., 360-degree or other omnidirectional) video content at a client device 104, such as a head-mounted display. The panoramic video content may originate and be streamed from a source device 102, such as a server. For example, the source device 102 may be the original source of the panoramic video content. In some embodiments, the source device 102 may be one or more intermediary devices that receive the panoramic video content directly or indirectly from an original source and relay the panoramic video content to one or more client devices 104. In some embodiments, the panoramic video content may be received after a request by the client device 104 is provided to the source device 102. For example, the client device 104 may transmit a Hypertext Transfer Protocol (HTTP) GET request to the source device 102 for the panoramic video content and/or other data, such as a manifest file comprising metadata associated with the panoramic video content.

In some embodiments, the panoramic video content that is received by the client device 104 may comprise viewport and non-viewport content. For example, viewport content may be defined as a portion of the panoramic video content, such as one or more tiles, which a user is currently viewing at the client device 104. Non-viewport content may be a portion of the panoramic video content which is not being viewed by a user at the client device 104. Non-viewport content is considered to be off-screen (e.g., a background view).

In an embodiment, the client device 104 may be configured to determine a tile set for a viewport area, a margin area, and a background area for the panoramic video content. For example, after receiving the tile-based panoramic video content from the source device 102, the client device 104 may determine a viewport area comprising a subset of the tiles, a margin area comprising a second subset of the tiles, and a background area comprising a third subset of the tiles. In this regard, the viewport area may comprise tiles which are rendered and visible to the user in a particular instance, the margin area may comprise tiles surrounding the tiles of the viewport area, and the background area may comprise tiles not visible to the user in the particular instance.

The client device 104 may determine at least one motion signal. In this regard, the client device 104 includes means, such as the processing circuitry 22, communication interface 26, or the like, for determining at least one motion signal at operation 602. In one embodiment, the at least one motion signal may be determined by receiving the at least one motion signal from another device or component. In another embodiment, the client device 104, such as an accelerometer and/or the like of the client device, may determine the at least one motion signal by measuring a motion of the client device. For example, the client device 104 may comprise circuitry for determining motion of the client device (e.g., HMD) and generating a motion signal, which may be provided by the circuitry to the client device 104 for processing. In some embodiments, the at least one motion signal may comprise an acceleration value associated with the acceleration of the client device 104 during a head turn.

At operation 603, the client device 104 may determine an updated tile set for the viewport region, the margin area, and the background area. In this regard, the client device 104 includes means, such as the processing circuitry 22, memory 24, or the like, for determining, based on the at least one motion signal, a viewport area, margin area, and background area for the panoramic video content. For example, based on one or more parameters related to motion, such as the direction and acceleration value of the at least one motion signal, the client device 104 may determine an updated tile set for the margin area. As described earlier with regards to at least FIG. 3A-C, the margin area may be intelligently updated to comprise uneven margins. In an embodiment in which the client device 104 receives a motion signal associated with a clockwise head turn, the margin area tile set may be updated to comprise a right margin having more tiles than a left margin. In this regard, a width of the margin area may be increased based at least on the direction and the acceleration value of the at least one motion signal, such as by increasing the width of the margin in the direction in which the head turns and, in some embodiments, by correspondingly reducing the width of the margin in the opposite direction.

Upon determining the updated tile sets for the viewport area, margin area, and background area based on the at least one motion signal, the client device 104 may include means, such as the processing circuitry 22, the communication interface 26 or the like, for generating a request for the updated tile sets in a respective quality. For example, for T tiles, the client device 104 may define three sets: V for tiles in the viewport area, M for tiles in the margin area, and B for tiles in the background area. The client device 104 may also include means, such as the processing circuitry 22 or the like, for determining a quality level, Q, for each set of tiles, which may be represented as Qv, Qm, and Qb, respectively. In some embodiments, the quality level associated with Qb, the background area tile set, may be a predefined lower-quality level, the viewport area quality level Qv may be a predefined higher-quality level, and the margin area quality level Qm may be a predefined intermediate quality level in between the quality levels of Qv and Qb.

At operation 604, the client device 104 may cause transmission of the request for updated panoramic video content to the source device 102. In an embodiment, the updated panoramic video content may be based on the updated viewport area, margin area, and background area. Additionally or alternatively, the updated panoramic video content may be in accordance with the respective quality level for the updated viewport area, the margin area, and the background area. In this regard, the client device 104 includes means, such as the processing circuitry 22, communication interface 26, or the like, for causing transmission of a request for updated panoramic video content to the source device. In some embodiments, the request may be an HTTP GET request comprising parameters associated with the determined quality levels.

The source device 102, upon receiving the request, may provide the updated panoramic video content to the client device 104. In this regard, the source device 102 may provide a plurality of tiles to the client device 102, with a subset of the tiles in accordance with the determined quality level of the background area, a subset of tiles in accordance with the determined quality level of the margin area, and a subset of tiles in accordance with the determined quality level of the viewport area. At operation 605, the client device 104 may receive the updated panoramic video content from the source device. In this regard, the client device 104 includes means, such as the processing circuitry 22, communication interface 26, or the like, for receiving, in response to the transmission of the request, the updated panoramic video content from the source device 102.

At operation 606, the client device 104 may cause rendering of the updated panoramic video content for display. In this regard, the client device 104 includes means, such as the processing circuitry 22, memory 24, or the like, for causing rendering of the updated panoramic video content for display. In some embodiments, the updated panoramic video content may be rendered for display at the client device 104, such as in instances in which the client device comprises an HMD. In an example embodiment, the client device 104 may also include a user interface, such as a display on which the updated panoramic video content may be rendered.

FIG. 6B is a signal diagram of an example data flow represented by method 600. Method 600 is described as being performed by at least one client device 104, and at least one source device 102. These devices may be similar to those previously discussed with regards to FIG. 1.

In some alternative embodiments, the client device 104 may generate and provide one or more motion signals to the source device 102, and the source device may comprise circuitry to determine one or more updated margin parameters associated with the margin area of panoramic video content. In other words, the source device 102 may adjust the margin area around the viewport area based on information received from the client device 102 and, in some embodiments, additionally update the quality level of the tiles for each area. FIG. 7A illustrates the signaling operations performed with respect to this source-driven alternative embodiment.

In an embodiment, the source device 102 may provide an offer comprising one or more video quality parameters (e.g., a manifest file) to the client device 104. In this regard, the source device 102 includes means, such as the processing circuitry 22, communication interface 26, or the like, for causing transmission, to a client device, of an offer comprising one or more video quality parameters. In some embodiments, the offer may comprise a session description protocol (SDP) offer. In some embodiments, the offer may further include one or more margin parameters. The client device 104 may provide a message comprising one or more margin parameters associated with a margin area to the source device 102. In some embodiments, the message may be provided in response to the client device receiving the offer. In this regard, the source device 102 includes means, such as the processing circuitry 22, communication interface 26, or the like, for receiving, from the client device 104, a message comprising one or more margin parameters associated with a margin area. In an embodiment, the one or more margin parameters may be associated with a measurement of limits to which the margin area may be extended. In some embodiments, the message may serve as an agreement between the client device 104 and source device 102 on particular values for the one or more margin parameters and/or one or more video quality parameters (e.g., quality levels).

In an embodiment, the margins on opposite sides of the viewport may grow and/or shrink independent of each other. For example, the margin on one side (e.g., right) may take any value within the agreed upon maximum limit independent of the margin extension on the other side (e.g., left). In this regard, the one or more margin parameters of the message from the client device 104 to the source device 102 may comprise one or more of the following fields in Table A. It is to be appreciated that each field value may be expressed in degrees, pixels, millimeters, centimeters, or other suitable unit.

TABLE A

| | |
|---|---|
| Max_L_Margin | The maximum length the viewport can be extended in the horizontal left direction during rotational head movement to the left side. |
| Max_R_Margin | The maximum length the viewport can be extended in the horizontal right direction during rotational head movement to the right side. |
| Max_T_Margin | The maximum length the viewport can be extended in the vertical top direction during rotational head movement to the upwards side. |
| Max_B_Margin | The maximum length the viewport can be extended in the vertical bottom direction during rotational head movement to the downwards side. |
| Max_DL_Margin | The maximum length the viewport can be extended in the diagonal (roll) left direction during tilting head movement to the left side. |
| Max_DR_Margin | The maximum length the viewport can be extended in the diagonal (roll) right direction during tilting head movement to the right side. |
| Max_FW_Margin | The maximum length the viewport can be extended in the forward direction during translational head movement to the forward direction. |
| Max_BW_Margin | The maximum length the viewport can be extended in the backward direction during translational head movement to the backward direction. |

In some embodiments, a fixed-size margin area may be required. For example, and as illustrated in FIGS. 4A-D and FIGS. 5A-D, with a fixed-size margin area, an extension in the margin on one side (e.g., left) results in a proportional decrease in the margin on the opposite side (e.g., right). In this embodiment, the one or more margin parameters of the message from the client device 104 to the source device 102 may comprise one or more of the following fields below in Table B. It is to be appreciated that each field value may be expressed in degrees, pixels, millimeters, centimeters, or other suitable unit.

TABLE B

| | |
|---|---|
| Max_L + R_Margin | The maximum length the viewport can be extended in the horizontal left and right directions during rotational horizontal head movement to the either the left or right sides. |
| Max_T + B_Margin | The maximum length the viewport can be extended in the vertical top and bottom directions during rotational vertical head movement to the upwards or downwards sides. |
| Max_DL + DR_Margin | The maximum length the viewport can be extended in the diagonal (roll) left and right directions during tilting head movement to either the left or right sides. |
| Max_FW + BW_Margin | The maximum length the viewport can be extended in the forward and backward direction during translational head movement to the forward and backward direction. |

In some embodiments, in addition to the above maximum margin area values, the one or more margin parameters of the message from the client device 104 to the source device 102 may comprise one or more parameters associated with minimum values to ensure the width of the margin area is not lowered more than a safe minimum threshold when the extension is in the opposite direction, such as one or more of the following fields below in Table C. It is to be appreciated that each field value may be expressed in degrees, pixels, millimeters, centimeters, or other suitable unit.

TABLE C

| | |
|---|---|
| Min_L_Margin | The minimum length the viewport can be extended in the horizontal left direction during rotational head movement to the right side. |
| Min_R_Margin | The minimum length the viewport can be extended in the horizontal right direction during rotational head movement to the left side. |
| Min_T_Margin | The minimum length the viewport can be extended in the vertical top direction during rotational head movement to the downwards side. |
| Min_B_Margin | The minimum length the viewport can be extended in the vertical bottom direction during rotational head movement to the upwards side. |
| Min_DL_Margin | The minimum length the viewport can be extended in the diagonal (roll) left direction during tilting head movement to the right side. |
| Min_DR_Margin | The minimum length the viewport can be extended in the diagonal (roll) right direction during tilting head movement to the left side. |
| Min_FW_Margin | The minimum length the viewport can be extended in the forward direction during translational head movement to the backward direction. |
| Min_BW_Margin | The minimum margin the viewport can be extended in the backward direction during translational head movement to the forward direction. |

At operation 702, the source device 102 may cause transmission of panoramic video content to the client device 104. In this regard, the source device 102 includes means, such as the processing circuitry 22, communication interface 26 or the like, for causing transmission of panoramic video content in accordance with the one or more margin parameters to the client device. In some embodiments, the panoramic video content may be tile-based panoramic video content.

At operation 703, the source device 102 may receive viewport data and at least one motion signal from the client device 104. In this regard, the client device 104 includes means, such as the processing circuitry 22, communication interface 26 or the like, for causing transmission of viewport data and at least one motion signal to the source device 102. The source device 102 includes means, such as the processing circuitry 22, communication interface 26 or the like, for receiving viewport data and at least one motion signal from the client device 104. In some embodiments, the viewport data may comprise data associated with an orientation of the client device 104. The at least one motion signal may comprise one or more motion parameters, such as data associated with a direction (e.g., a direction of a user's head motion while wearing an HMD) and an acceleration value (e.g., a speed of the head motion).

At operation 704, the source device 102 may determine an updated margin area for the panoramic video content. In this regard, the source device 102 includes means, such as the processing circuitry 22, memory 24 or the like, for determining, based on the viewport data and at least one motion signal, an updated margin area for the panoramic video content. The updated margin area may comprise one or more tiles that the source device 102 has determined to include in the updated margin area based on the received viewport data and at least one motion signal. For example, upon receiving a motion signal indicating a clockwise turn at a particular acceleration, the source device 102 may determine additional tiles to include in a right margin area of the panoramic video content.

In some embodiments, the source device 102 may determine, based at least on the updated margin area, one or more updated video quality parameters associated with the panoramic video content. For example, the source device 102 may determine a quality level for the updated margin area (e.g., the tiles in the updated margin area), the background area, and the viewport area.

At operation 706, the source device 102 may cause transmission of updated panoramic video content in accordance with the updated margin area for display. In some embodiments, the source device 102 may cause transmission of updated panoramic video content to the client device 104 for display. In this regard, the source device 102 includes means, such as the processing circuitry 22, communication interface 26 or the like, for causing transmission of updated panoramic video content in accordance with the updated margin area for display. In embodiments in which the source device 102 determines one or more updated video quality parameters associated with the panoramic video content, the updated panoramic video content may be transmitted in further accordance with the one or more updated video quality parameters.

FIG. 7B is a signal diagram of an example data flow represented by method 700. Method 700 is described as being performed by a source device 102 and client device 104. These devices may be similar to those previously discussed with regards to FIG. 7.

As described above, a method, apparatus, and computer program product are disclosed for providing for intelligently extended margins around a viewport for immersive content. By providing for intelligent margin extension, user experience during immersive content consumption may be improved while avoiding unnecessary increases in latency and bandwidth consumption.

FIGS. 6A and 7A illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
    receiving, from a client device, a message comprising one or more margin parameters associated with a margin area;
    in response to the message, causing transmission of panoramic video content in accordance with the one or more margin parameters to the client device;
    receiving viewport data and at least one motion signal from the client device;
    determining, based on the viewport data and the at least one motion signal and at least one of video content or audio content associated with the panoramic video content, an updated margin area for the panoramic video content, wherein the updated margin area is determined further based on at least one threshold for an acceleration of the client device, wherein the acceleration is determined based, at least partially, on the at least one motion signal; and
    causing transmission of updated panoramic video content based on the updated margin area for display.

2. A method according to claim 1, further comprising:
    causing transmission, to the client device, of an offer comprising one or more video quality parameters, wherein the message is received in response to the offer, wherein the offer comprises a session description protocol offer; and wherein the transmission of the panoramic video content is further based on the one or more video quality parameters.

3. A method according to claim 2, further comprising:
    determining, based at least on the updated margin area, one or more updated video quality parameters associated with the updated panoramic video content, wherein the updated panoramic video content is transmitted in further accordance with the one or more updated video quality parameters.

4. A method according to claim 1, wherein the at least one motion signal comprises at least one of: an orientation value, a speed value, or an acceleration value; and wherein the viewport data comprises an orientation of the client device.

5. A method according to claim 1, wherein the one or more margin parameters of an acceptance message comprise at least one of the following:
    one or more maximum values at which a respective margin of the panoramic video content is extendible; or
    one or more minimum values at which the respective margin of the panoramic video content is extendible.

6. A method according to claim 5, wherein the one or more margin parameters of the acceptance message are associated with a fixed-size margin area, further comprising:
    determining one or more updated margin parameters for the updated panoramic video content in accordance with the fixed-size margin area.

7. A method according to claim 1, wherein the margin area around a viewport area is extended unevenly according to head turning direction and direction of an updated viewport.

8. The method of claim 1, wherein the updated panoramic video content is caused to be transmitted to the client device via a source device.

9. An apparatus comprising:
    at least one processor; and
    at least one memory storing instructions that, when executed with the at least one processor, cause the apparatus at least to:
        receive a message comprising one or more margin parameters associated with a margin area;
        in response to the message, cause transmission of panoramic video content in accordance with the one or more margin parameters;
        receive viewport data and at least one motion signal;
        determine, based on the viewport data and the at least one motion signal and at least one of video content or audio content associated with the panoramic video content, an updated margin area for the panoramic video content, wherein the updated margin area is determined further based on at least one threshold for an acceleration of the client device, wherein the acceleration is determined based, at least partially, on the at least one motion signal; and cause transmission of updated panoramic video content based on the updated margin area for display.

10. An apparatus according to claim 9, wherein the at least one memory stores instructions that, when executed with the at least one processor, cause the apparatus to:

cause transmission of an offer comprising one or more video quality parameters, wherein the message is received in response to the offer, wherein the offer comprises a session description protocol offer, and wherein the transmission of the panoramic video content is further based on the one or more video quality parameters.

11. An apparatus according to claim 9, wherein the at least one memory stores instructions that, when executed with the at least one processor, cause the apparatus to:

determine, based at least on the updated margin area, one or more updated video quality parameters associated with the updated panoramic video content, wherein the updated panoramic video content is transmitted in further accordance with the one or more updated video quality parameters.

12. An apparatus according to claim 9, wherein the at least one motion signal comprises at least one of: an orientation value, a speed value, or an acceleration value; and wherein the viewport data comprises an orientation of the client device.

13. An apparatus according to claim 9, wherein the one or more margin parameters of an acceptance message comprise at least one of the following:

one or more maximum values at which a respective margin of the panoramic video content is extendible, or one or more minimum values at which the respective margin of the panoramic video content is extendible.

14. An apparatus according to claim 13, wherein the one or more margin parameters of the acceptance message are associated with a fixed-size margin area, wherein the at least one memory stores instructions that, when executed with the at least one processor, cause the apparatus to:

determine one or more updated margin parameters for the updated panoramic video content in accordance with the fixed-size margin area.

15. A method comprising:

receiving, at a client device, panoramic video content from a source device;

determining, at the client device, at least one motion signal;

determining, based on the at least one motion signal, a viewport area, a margin area, and a background area for the panoramic video content, wherein a width of the margin area is increased based at least on a direction of the at least one motion signal;

determining a respective quality level for the viewport area, the margin area, and the background area;

causing reception of an updated panoramic video content at the client device, wherein the updated panoramic video content is based on the viewport area, the margin area, and the background area and in accordance with the respective quality level for the viewport area, the margin area, and the background area, wherein an updated margin area of the updated panoramic video content is based, at least partially, on at least one of video content or audio content associated with the panoramic video content, and further based on at least one threshold for an acceleration of the client device, wherein the acceleration is determined based, at least partially, on the at least one motion signal; and causing rendering of the updated panoramic video content for display.

16. A method according to claim 15, wherein the at least one motion signal comprises data associated with the direction and an acceleration value;

wherein the width of the margin area is increased based at least on the direction and the acceleration value of the at least one motion signal;

wherein the panoramic video content is tile-based;

wherein the viewport area, the margin area, and the background area respectively comprise a subset of tiles of a plurality of tiles associated with the panoramic video content; and wherein the client device comprises a head-mounted display.

17. An apparatus comprising:

at least one processor; and at least one memory storing instructions that, when executed with the at least one processor, cause the apparatus at least to:

receive panoramic video content;

determine at least one motion signal;

determine, based on the at least one motion signal, a viewport area, a margin area, and background area for the panoramic video content, wherein a width of the margin area is increased based at least on a direction of the at least one motion signal;

determine a respective quality level for the viewport area, the margin area, and the background area;

cause reception of an updated panoramic video content at the client device, wherein the updated panoramic video content is based on the viewport area, the margin area, and the background area and in accordance with the respective quality level for the viewport area, the margin area, and the background area, wherein an updated margin area of the updated panoramic video content is based, at least partially, on at least one of video content or audio content associated with the panoramic video content, and further based on at least one threshold for an acceleration of the client device, wherein the acceleration is determined based, at least partially, on the at least one motion signal; and cause rendering of the updated panoramic video content for display.

18. An apparatus according to claim 17, wherein the at least one motion signal comprises data associated with the direction and an acceleration value;

wherein the width of the margin area is increased based at least on the direction and the acceleration value of the at least one motion signal;

wherein the panoramic video content is tile-based;

wherein the viewport area, the margin area, and the background area respectively comprise a subset of tiles of a plurality of tiles associated with the panoramic video content.

19. A computer program product comprising a non-transitory computer readable storage medium having program code portions stored thereon, the program code portions configured, upon execution, to cause the method as claimed in claim 1 to be performed.

20. A computer program product comprising a non-transitory computer readable storage medium having program code portions stored thereon, the program code portions configured, upon execution, to cause the method as claimed in claim 15 to be performed.

\* \* \* \* \*